United States Patent
Wortham

(10) Patent No.: US 7,308,272 B1
(45) Date of Patent: Dec. 11, 2007

(54) MOBILE PHONE LOCATOR

(75) Inventor: Larry C. Wortham, Garland, TX (US)

(73) Assignee: On-Board Communications, Inc., Dallas, TX (US)

(*) Notice: Subject to any disclaimer, the term of this patent is extended or adjusted under 35 U.S.C. 154(b) by 454 days.

(21) Appl. No.: 10/278,707

(22) Filed: Oct. 22, 2002

Related U.S. Application Data

(60) Provisional application No. 60/336,069, filed on Oct. 25, 2001.

(51) Int. Cl.
*H04Q 7/20* (2006.01)
(52) U.S. Cl. .................................... 455/456.1
(58) Field of Classification Search ............ 455/456, 455/95, 99, 569, 575.1, 575.8, 575.9, 456.1–456.6, 455/404.02; 340/426.19, 904, 359.13
See application file for complete search history.

(56) References Cited

U.S. PATENT DOCUMENTS

| | | | | |
|---|---|---|---|---|
| 4,812,843 A | | 3/1989 | Champion, III et al. .... | 340/905 |
| 4,982,070 A | | 1/1991 | Bezin et al. ................. | 235/378 |
| 5,144,318 A | | 9/1992 | Kishi .......................... | 342/357 |
| 5,161,255 A | * | 11/1992 | Tsuchiya .................... | 455/345 |
| 5,239,669 A | | 8/1993 | Mason et al. ................. | 455/12 |
| 5,334,974 A | * | 8/1994 | Simms et al. ............... | 340/990 |
| 5,515,043 A | * | 5/1996 | Berard et al. ............... | 340/988 |
| 5,555,286 A | | 9/1996 | Tendler ........................ | 379/59 |
| 5,589,835 A | * | 12/1996 | Gildea et al. ......... | 342/357.03 |
| 5,742,666 A | | 4/1998 | Alpert ........................ | 379/58 |
| 5,777,580 A | * | 7/1998 | Janky et al. ................ | 342/457 |
| 5,832,390 A | * | 11/1998 | Irvin ........................ | 455/569.2 |
| 5,883,594 A | * | 3/1999 | Lau ........................... | 342/357.1 |
| 5,898,391 A | | 4/1999 | Jefferies et al. ............. | 340/988 |
| 5,914,675 A | * | 6/1999 | Tognazzini ................. | 340/989 |
| 5,918,180 A | | 6/1999 | Dimino ....................... | 455/456 |

(Continued)

OTHER PUBLICATIONS

Imel, et al., "Understanding Wireless Communications in Public Safety, A Guidebook to Technology, Issues, Planning, and Management," National Law Enforcement and Corrections Technology Center, Mar. 2000, Revised Aug. 2000 (134 pages).

(Continued)

*Primary Examiner*—William Trost
*Assistant Examiner*—Marivelisse Santiago-Cordero
(74) *Attorney, Agent, or Firm*—Baker Botts L.L.P.

(57) ABSTRACT

According to one embodiment of the invention, a mobile phone locator is provided. The mobile phone locator includes a portable housing. The mobile phone locator also includes a position locator positioned at least partially in the portable housing. The position locator is operable to determine a location by receiving information from one or more satellites and to transmit a signal indicating the determined location. The mobile phone locator also includes a converter positioned in the portable housing and coupled to the position locator. The converter is operable to convert the signal received from the position locator into an output signal for the mobile phone. The output signal is a non-speech, audible signal that is receivable by a microphone of a mobile phone to be located. The mobile phone locator also includes an output device positioned at least partially in the portable housing and coupled to the converter. The output device is operable to send the output signal to the mobile phone.

34 Claims, 8 Drawing Sheets

U.S. PATENT DOCUMENTS

| | | | |
|---|---|---|---|
| 6,028,537 | A | 2/2000 | Suman et al. ............... 340/988 |
| 6,057,887 | A | 5/2000 | Imanaka et al. ............ 348/553 |
| 6,064,323 | A | 5/2000 | Ishii et al. .................. 340/995 |
| 6,067,018 | A | 5/2000 | Skelton et al. .............. 340/573 |
| 6,085,090 | A * | 7/2000 | Yee et al. .................... 455/440 |
| 6,111,539 | A | 8/2000 | Mannings et al. .......... 342/357 |
| 6,121,922 | A * | 9/2000 | Mohan .................... 342/357.1 |
| 6,133,873 | A * | 10/2000 | Krasner ................. 342/357.12 |
| 6,144,336 | A | 11/2000 | Preston et al. .............. 342/357 |
| 6,169,515 | B1 | 1/2001 | Mannings et al. .......... 342/357 |
| 6,184,801 | B1 | 2/2001 | Janky ......................... 340/988 |
| 6,199,045 | B1 * | 3/2001 | Giniger et al. ................. 705/1 |
| 6,201,498 | B1 | 3/2001 | Fan ............................. 342/357 |
| 6,211,777 | B1 * | 4/2001 | Greenwood et al. ........ 340/436 |
| 6,236,358 | B1 | 5/2001 | Durst et al. ................. 342/357 |
| 6,243,003 | B1 | 6/2001 | DeLine et al. .............. 340/425 |
| 6,275,164 | B1 | 8/2001 | MacConnell et al. ....... 340/692 |
| 6,295,449 | B1 * | 9/2001 | Westerlage et al. ...... 455/422.1 |
| 6,314,308 | B1 * | 11/2001 | Sheynblat et al. .......... 455/574 |
| 6,448,927 | B1 * | 9/2002 | Ishigaki et al. ........ 342/357.06 |
| 6,489,921 | B1 * | 12/2002 | Wilkinson ............. 342/357.08 |
| 6,516,198 | B1 * | 2/2003 | Tendler ................... 455/456.3 |
| 6,678,612 | B1 * | 1/2004 | Khawam .................... 701/213 |
| 6,909,907 | B1 * | 6/2005 | Oyang et al. ............ 455/556.1 |
| 2001/0014597 | A1 * | 8/2001 | Takiguchi et al. .......... 455/343 |
| 2002/0004704 | A1 * | 1/2002 | Nagatsuma et al. ........ 701/213 |
| 2003/0139150 | A1 * | 7/2003 | Rodriguez et al. ............ 455/90 |

OTHER PUBLICATIONS

APCO International, Goals and Milestones for Wireless Enhanced 9-1-1, *Helping make wireless enhanced 9-1-1 a reality* . . . , APCO Wireless Enhanced 9-1-1 Update. (4 pages), no date available.

Geer, "The E911 Dilemma, Why you can't always get help on your cell phone when you need it most," wwwWBT2.com Nov./Dec. 2001. (4 pages).

U.S. Department of Transportation Wireless E9-1-1 Initiative, Department of Transportation, United States of America (4 pages), no date available.

"Surge in Cell Phone Calls Strains 911 System, Report Says," *The Washington Post*, Sep. 11, 2001 (2 pages).

TruePos!tion™, TruePosition® Wireless Location System™, © 2001, TruePosition, Inc., no date available.

Statement of Thomas J. Sugrue, Chief, Wireless Telecommunications Bureau, Federal Communications Commission, Submitted to Subcommittee on Telecommunications Trade, and Consumer Protection, Committee on Commerce, United States House of Representatives, Hearing on Wireless E911 on Jun. 14, 2001 (10 pages).

"Location Technologies for GSM, GPRS and WCDMA Networks," SnapTrack, A QUALCOMM Company, Sep. 2001 Location Technologies-WP X1 (35 pages).

Burns Announces Unveiling of 9-1-1: Report Card to the *NatioReport Grades Performance of 9-1-1 in the U.S.*, Conrad Burns, U.S. Senator, Montana, Sep. 11, 2001 (1 page).

Allard Prises 9-1-1 Study, Senator Recognizes Colorado Company for Safety Technology, Wayne Allard, U.S. Senator, Colorado, Sep. 11, 2001 (1 page).

NENA, Recommended Data Standards for Local Exchange Carriers, ALI Service Providers & 9-1-1 Jurisdictions, Jan. 2002 Draft. (50 pages).

"Recent FCC Rulings & Mandates" (2 pages), no date available, printed on Oct. 17, 2002.

Report Card to the Nation: The Effectiveness, Accessibility and Future of America's 9-1-1 Service © 2001, National Emergency Number Association (NENA), Produced by the RCN Commission and NENA, Columbus, Ohio (24 pages).

2nd Quarterly Report, 2002 (3 pages), no date available.

Product Development Roadmap Agenda, May 8, 2002 (1 page).

Fact Sheet, FCC Wireless 911 Requirements, WTB/Policy, Jan. 2001 (4 pages).

Fact Sheet: E911 Phase II Decisions, Oct. 2001, *This is an unofficial announcement of Commission action. Release of the full text of a Commission order constitutes official action.* (5 pages).

Federal Communication Commission, FCC 01-175, Before the Federal Communications Commission, Washington, D.C. 20554, Further Notice of Proposed Rulemaking, Adopted May 23, 2001, Released May 25, 2001 (18 pages).

NENA Wireless Phase II Matrix, © 2000 National Emergency Number Association (6 pages), no date available.

NENA Master Glossary of 9-1-1 Terminology, NENA-01-002, Mar. 1998 (Original) (17 pages).

NENA Technical Information Document on Future 9-1-1 Models, Issue 3, Oct. 2000, (31 pages).

Wireless Communications and Public Safety Act (S.800) is Signed Into Law—9-1-1 is Now The Universal Emergency Phone Number, National Emergency Number Association (1 page), Oct. 26, 1999.

Project LOCATE, Locate our Citizens at Times of Emergency, 2002 Special Report, APCO International. (24 pages), no date available.

Letter to Thomas E. Wheeler, President/CEO of CTIA, from Association of Public Safety Communications Officials-International, Inc. National Emergency Number Association, National Association of State Nine One One Administrators, Jul. 2, 2001 (3 pages).

Public Notice, Federal Communications Commission, Wireless Telecommunications Bureau Provides Guidance on Carrier Reports on Implementation of Wireless E911 Phase II Automatic Location Identification, DA 00-2099 Released Sep. 14, 2000 (4 pages).

A Short DTMF Primer, Personal Location Translator, Wortham, Oct. 15, 2001 (2 pages).

News Release, Driscoll-Wolfe, Driscoll-Wolfe Releases 2002 Nationwide Study on Consumer Interest in Location-Based Services, May 6, 2002 (4 pages).

News Release, Driscoll-Wolfe, Driscoll-Wolfe Releases Nationwide Survey of Telematic Systems Owners and Users, Oct. 7, 2002 (3 pages).

Public Notice, Federal Communications Commission, Wireless Telecommunications Bureau Seeks Comment on Petitions for Temporary Waiver of Deadline by which Digital Wireless Systems Must Be Capable of Transmitting 911 Calls from TTY Devices, DA 02-640 Released Mar. 19, 2002 (3 pages).

Public Notice, Federal Communications Commission, Wireless Bureau Announces Details of Inquiry on Technical and Operational Wireless E911 issues, DA 02-523 Released Mar. 5, 2002 (3 pages).

Letter to the Board of Directors, National Emergency Number Association and Association of Public-Safety Communications from CTIA, Jun. 24, 2001 (4 pages).

News Release from U.S. Congressman Gene Green, Green Joins NENA, Senators, and Members of Congress to Unveil the First 911 Report Card to the Nation, Sep. 5, 2001 (2 pages).

Public Notice, Federal Communications Commission, WTB Seeks Comment on Wireless E911 Phase II Waiver Request Filed by Cingular Wireless, LLC, DA 01-1628 Released Jul. 11, 2001 (2 pages).

Letter to Federal Communication Commission from Mintz, et al., Counsel for AT&T Wireless Services, Inc., Jan. 8, 2001, re Nov. 9, 2000 E911 Phase II Carrier Implementation Report (15 pages).

Error! Unknown Switch Argument—for Release Tuesday, Jul. 14, 1994, re AAA Signs Deals with AT&T Valued at $100 Million Over 5 Years (2 Pages), Jul. 19, 1994.

9-1-1 Tutorial, NENA TDC (68 pages), no date available, Printed On Oct. 17, 2002.

Police Can't Pinpoint Many 911 Calls—downloaded www.cnn.com/2002/TECH/ptech/10/15/wireless 911.ap/index.html (Oct. 16, 2002) (4 pages).

* cited by examiner

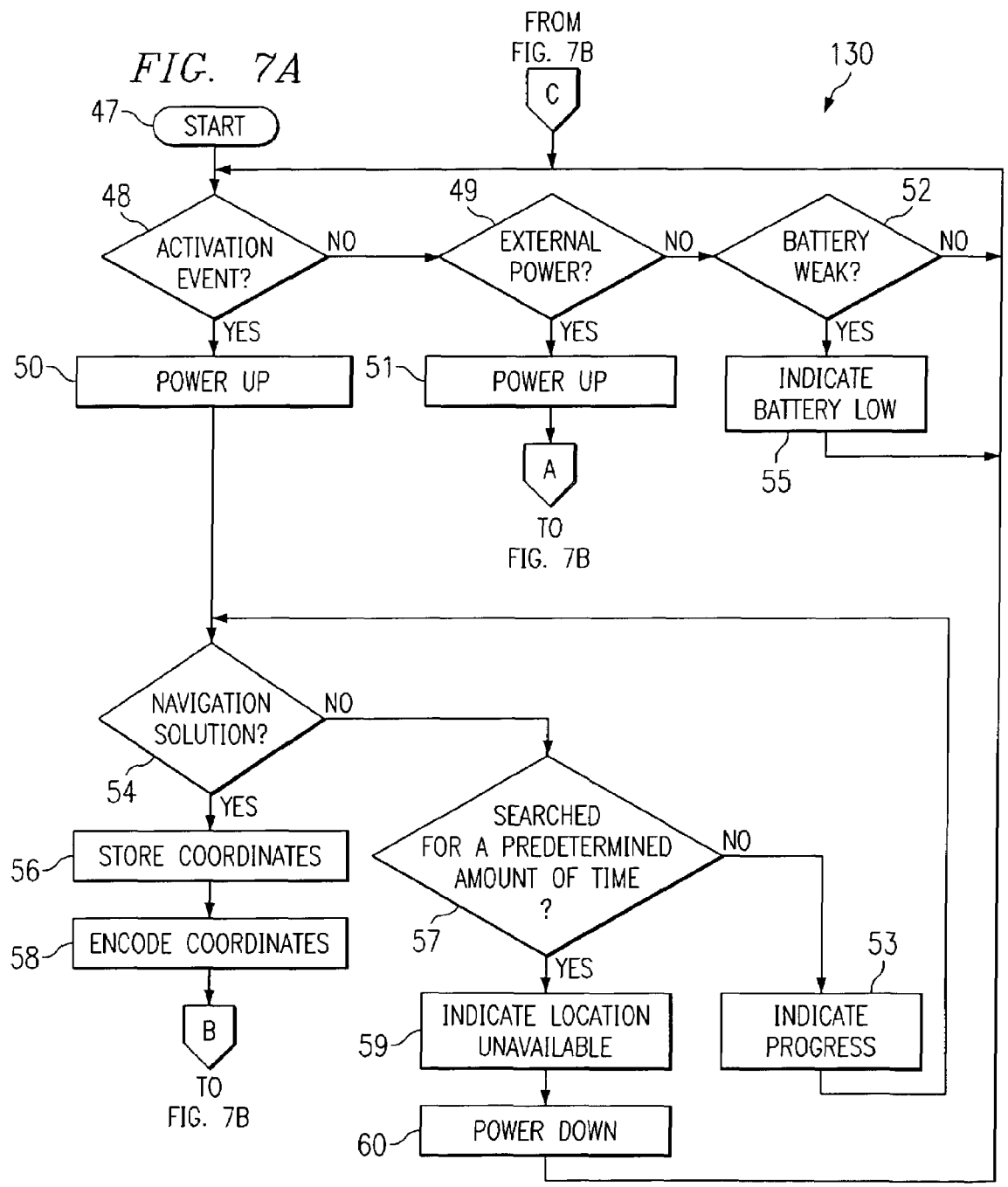

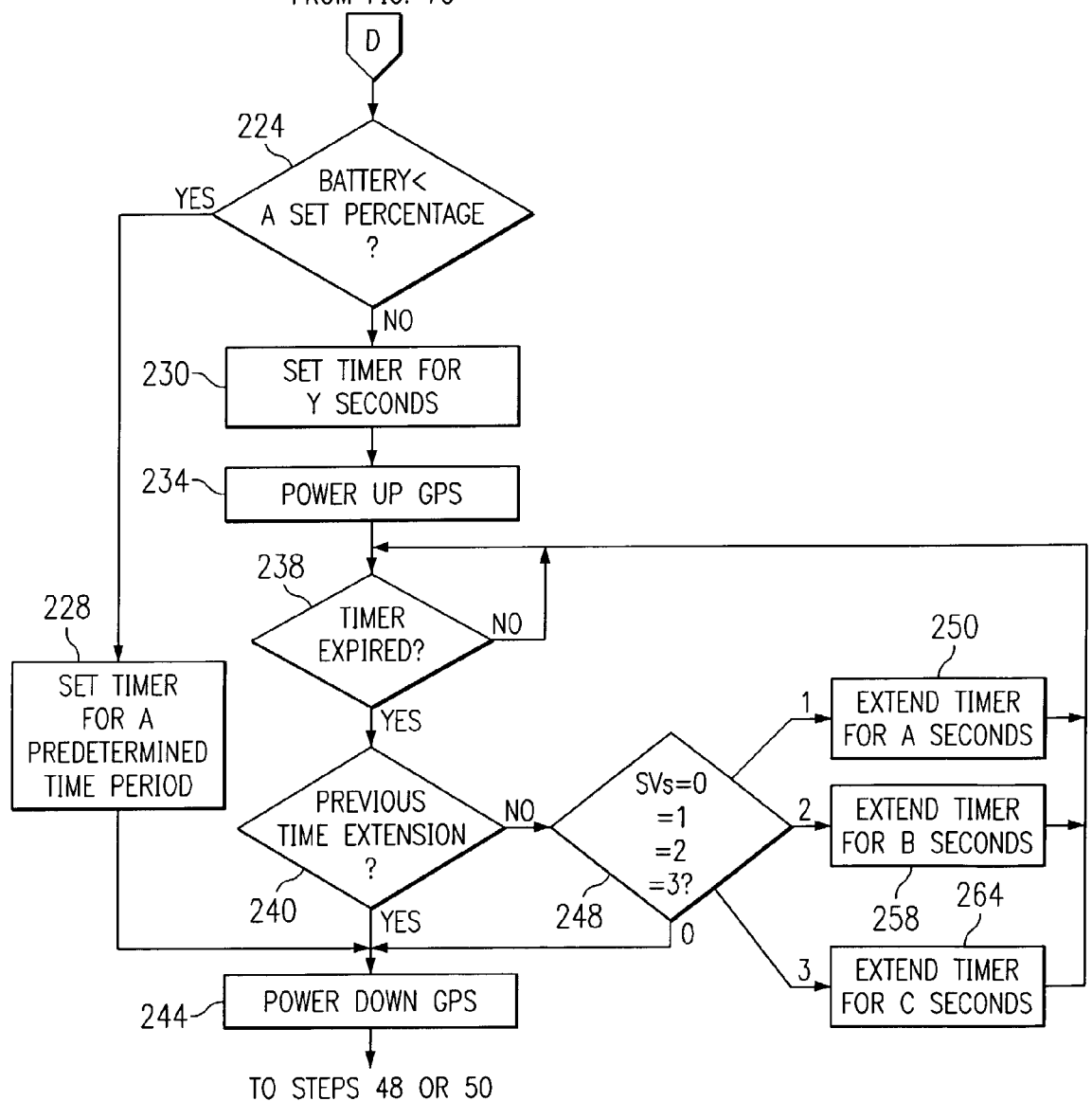

MOBILE PHONE LOCATOR

RELATED APPLICATIONS

This application claims the benefit under 35 U.S.C. §119 (e) of the filing date of U.S. Provisional Application Ser. No. 60/336,069, filed Oct. 25, 2001 entitled Method and Apparatus for Personal Location Determination Using A Conventional Mobile Phone.

TECHNICAL FIELD OF THE INVENTION

This invention relates generally to the field of communications and more particularly to a mobile phone locator.

BACKGROUND OF THE INVENTION

The Federal Communications Commission's ("FCC") enhanced 911 ("E911") initiative strives to improve the emergency call service by providing a mobile telephone user's identification and physical location during a call. To that end, the FCC issued a mandate requiring the communications industry to modify the existing wireless communications architecture and associated wireless phones so that the wireless caller's location may be ascertained from a designated Public Safety Answering Point ("PSAP"). This feature is referred to as Automatic Location Identification ("ALI").

To date, and with widespread frustration in the wireless communications industry, the introduction of ALI mobile phones has yet to materialize in any significant way. Because of the technological difficulties of modifying the existing communications architecture, FCC has extended the deadline for compliance with the issued mandate at the request of the wireless communications industry.

SUMMARY OF THE INVENTION

According to one embodiment of the invention, a mobile phone locator is provided. The mobile phone locator includes a portable housing. The mobile phone locator also includes a position locator positioned at least partially in the portable housing. The position locator is operable to determine a location by receiving information from one or more satellites and to transmit a signal indicating the determined location. The mobile phone locator also includes a converter positioned in the portable housing and coupled to the position locator. The converter is operable to convert the signal received from the position locator into an output signal for the mobile phone. The output signal is a non-speech, audible signal that is receivable by a microphone of a mobile phone to be located. The mobile phone locator also includes an output device positioned at least partially in the portable housing and coupled to the converter. The output device is operable to send the output signal to the mobile phone.

According to one embodiment of the invention, a method for locating a mobile phone is provided. The method includes providing an apparatus for locating a mobile phone. The apparatus is operable to determine a location by receiving information from one or more satellites and to wirelessly transmit an output signal indicating the determined location. The output signal has an effective range. The method also includes coupling the apparatus to a window of a vehicle. The method also includes positioning an input unit of the mobile phone within the effective range of the output signal.

Some embodiments of the invention provide numerous technical advantages. Some embodiments may benefit from some, none, or all of these advantages. For example, according to one embodiment, the location of a mobile phone and its user may be ascertained at other locations, such as a PSAP, without a massive overhaul of the existing communications architecture or modification of the mobile phone. According to another embodiment, the procedure that a user may be required to follow to communicate the location of the user is simplified. According to another embodiment, information concerning emergency situations may be communicated to emergency agencies with a reduced level of interaction by the user.

Other technical advantages may be readily ascertained by one of skill in the art.

BRIEF DESCRIPTION OF THE DRAWINGS

Reference is now made to the following description taken in conjunction with the accompanying drawings, wherein like reference numbers represent like parts, in which:

FIGS. 7A and 7B are flow charts illustrating one embodiment of a method of determining a location of a mobile phone;

FIGS. 7C and 7D are flow charts illustrating one embodiment of a method of power management and information update that may be used in conjunction with the method of FIGS. 7A and 7B;

DETAILED DESCRIPTION OF EXAMPLE EMBODIMENTS OF THE INVENTION

Embodiments of the invention are best understood by referring to FIGS. 1 through 8B of the drawings, like numerals being used for like and corresponding parts of the various drawings.

Figure 1:
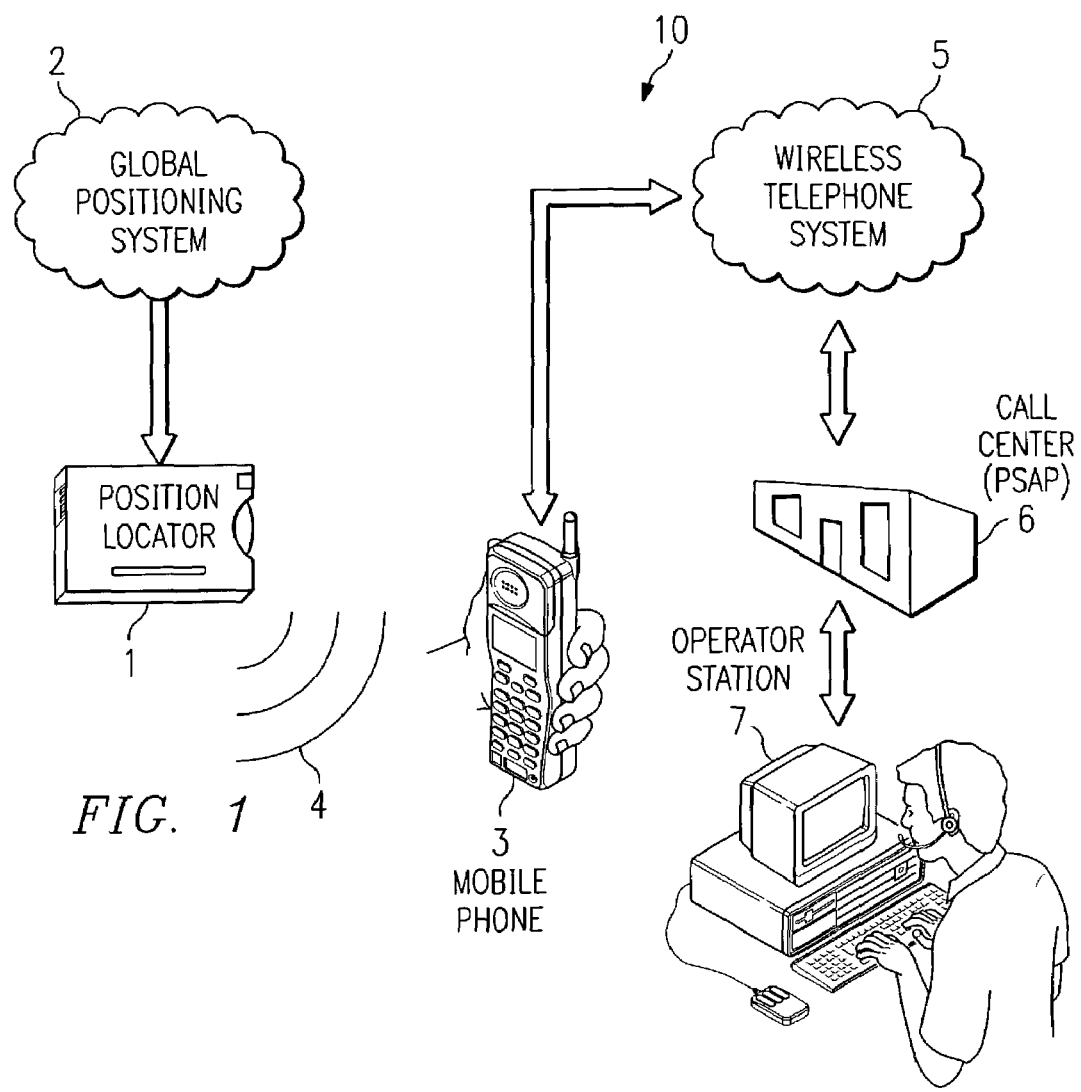
FIG. 1 is a schematic diagram illustrating one embodiment of a communications architecture that may benefit from the teachings of the present invention.

FIG. 1 is a schematic diagram illustrating one embodiment of a communications architecture 10 that may benefit from some embodiments of the invention. Communications architecture 10 comprises a wireless communications network 5 that allows a mobile communications device 3 to communicate with others, such as an operator 7. In some embodiments, the communication between mobile communications device 3 and operator 7 also passes through a call center 6 that manages and distributes incoming and outgoing communications for operator 7.

Mobile communications device 3 may be any portable device that allows a user to communicate with another party over network 5. Examples of mobile communications device 3 include a cellular phone, a personal digital assistant ("PDA"), a wireless email device, a hand-held computer, or other devices or combination of these devices. Mobile communications device 3 is referred to herein as a mobile phone 3; however, mobile phone 3 may be any mobile communications device.

Communications network 5 may include any network of communications devices and channels that are operable carry communications signals between two or more parties. For example, network 5 may include antennae for transmitting and receiving wireless communication signals to and from mobile phone 3. Network 5 may also include the internet, various intranets, ethernet networks, wireless telephone systems, and plain old telephone systems ("POTS").

Call center 6 may be a system or an organization that manages calls to and from operator 7. For example, call center 6 may comprise one or more banks of computers (not explicitly shown) that automatically route calls from network 5 based on protocols that are set up using advanced intelligent network ("AIN"). Call center 6 may also comprise a switchboard operated by persons or computers that may be used to route calls based on a set of rules. For example, call center 6 may be an emergency call center that receives "911" emergency calls and routes the calls to operators 7 of emergency agencies, such as fire stations, that are located closest to the respective origins of the "911" calls. Call center 6 may also be a Public Safety Answering Point ("PSAP") that is established as a part of the enhanced 911 ("E911") initiative by the Federal Communications Commission ("FCC").

Mobile phone 3 is required to have Automatic Location Identification ("ALI") capability in the future under the E911 initiative. ALI refers to the capability of mobile phone 3 to transmit its location data to a third party, such as a PSAP. To provide mobile phone 3 with ALI capability, the wireless industry is pursuing two fundamental approaches and a third hybrid technique: 1) Global Positioning System ("GPS") enabled handset, 2) a network-based solution and 3) a network assisted GPS approach. All three approaches have significant technical and economic challenges.

The GPS handset method has difficulty working indoors because of the very weak satellite signals. GPS antenna location and orientation are critical for proper GPS operation. However, even state of the art GPS receivers have problems with reception in automobiles because of the metal roof. Obstructions between the satellites and the antenna and poorly directed antennas (with respect to the sky) are two major causes for satellite signal acquisition failure. For GPS enabled handsets, the control of these factors are in the hands of the user. However, there is a high probability of satellite signal acquisition failure when a panic-stricken user is moving about during the call and unaware of the GPS acquisition idiosyncrasies. This especially problematic because strong GPS signals are more critical for initial satellite acquisition than for subsequent tracking. Additionally, today's GPS receivers require too much power for operation for the GPS receivers to be left operating the entire time the phone is on. In fact, some consume more power than the mobile phone itself. So the current strategy is to intermittently power the GPS receiver in the mobile phone on an as-needed basis to conserve battery life. Although a power management scheme conserves the battery of a phone, it also requires the GPS receiver to power up (cold start) and reacquire ephemeris data before it can determine a location. A cold-start position fix can easily take 45 seconds or more, even with today's premium grade GPS receivers. Further, for every cold start, the user is required to hold the phone in an optimal position (outdoors) long enough to acquire the necessary signals.

The network-based solution requires a very precise system timing over the wireless network(s) because GPS is not used. In place of GPS, three or more time-difference-of-arrival ("TDOA") measurements of a mobile phone's signal are measured by cell sites and used to triangulate the location of the phone. To meet the E911 accuracy mandate, nanosecond system timing is required along with large amounts of control data across the network. Furthermore, there is a multitude of independently operating wireless technologies, such as Advanced Mobile Phone Service, Code Division Multiple Access, Time Division Multiple Access, Global System for Mobile communication, and Integrated Digital Enhanced Network, which adds to the complexity and magnitude restructuring the existing network to implement this approach.

The network assisted GPS ("AGPS") technique involves enhancements to both mobile phone 3 and the supporting wireless network 5. AGPS attempts to overcome the initial satellite acquisition problem by receiving current ephemeris data from a central wireless network server, taking a data snapshot of all the satellites in view based on the ephemeris data it received and sending the snapshot back to the central wireless network server. The navigation solution is then computed by the server and sent back to the mobile phone. This approach requires significant changes to the wireless infrastructure. Large amounts of control data will have to traverse the network. Further, each of the wireless technologies operating today would have to develop their own data delivery mechanism. All of these add to the complexity and cost of modifying the existing network infrastructure.

According to some embodiments of the present invention, an apparatus, system and method are provided that allow the determination of a phone's location without any modification to a supporting wireless network or positioning a GPS device within the mobile phone. This is advantageous in some embodiments of the invention because the cost and effort of modifying a mobile phone, a wireless network, or both, may be avoided. According to another embodiment, the procedure that a user may be required to follow to communicate the location of the user is simplified. According to another embodiment, information concerning emergency situations may be communicated to emergency agencies with reduced level of interaction by the user. Additional details of example embodiments of the invention are described in greater detail below in conjunction with portions of FIG. 1 and FIGS. 2 through 8B.

Referring back to FIG. 1, a position locator 1 is provided for use in conjunction with a mobile phone, such as mobile phone 3; however, position locator 1 may also be used in conjunction with any communication device, such as a radio or a conventional telephone. Position locator 1 is operable to determine a location by receiving information from one or more satellites and to wirelessly transmit an output signal indicating the determined location. In one embodiment, position locator 1 includes a Location Determination System (LDS) receiver operable to work in conjunction with a system 2, such as the Global Positioning System (GPS) or Glonass, to determine a location. GPS system 2 is used herein as an example of system 2; however, other location determination systems may also be used. In one embodiment, a physically separate mobile phone 3 of any type is used to place an emergency or other service request call and then positioned near locator 1 by the user so that an emanating output signal 4, such as acoustic tone, encoded with the coordinate data may be transferred to mobile phone 3. In one embodiment where output signal 4 is acoustic tone, signal 4 is sent over wireless telephone network 5 on the voice path to call center 6 where the call is then routed to operator 7. In some embodiments, operator 7 may be physically located in call center 6. The encoded tones are decoded either at call center 6 or by a computer accessible to operator 7 and the caller's location is presented on a computer screen, for example. In another embodiment, output signal 4 may be in other formats, such as radio frequency ("RF") or infrared signals. One example of infrared signal format is the IrDA standard.

Figure 2:
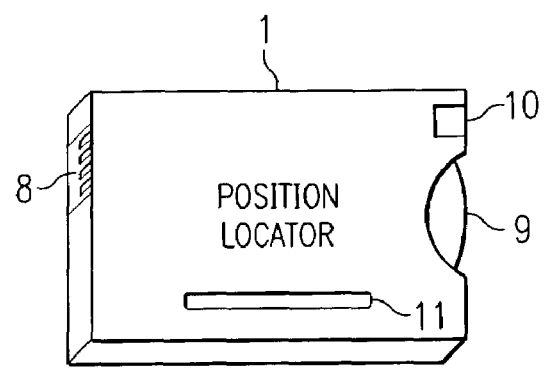
FIG. 2 is a schematic diagram illustrating one embodiment of a position locator of FIG. 1.

FIG. 2 is a schematic diagram of one embodiment of position locator 1. In one embodiment, locator 1 is approximately the same length and width as a credit card and slightly thicker than a credit card; however, locator 1 may have other physical dimensions. In one embodiment, locator 1 may be attached to a vehicle window, such as a windshield, with hook-and-loop fastening strips, such as Velcro®; however, other fastening devices, such as adhesives or suction cups may be used. In one embodiment, position locator 1 may comprise an activation trigger 9 that may be used to initiate locator 1 to determine a location and transmit output signal 4 indicating the determined location. In one embodiment, activation trigger 9 may be used to repeat the transmission of output signal 4 if locator 1 is already activated.

In one embodiment, a visual indicator 10, such as a Light Emitting Diode ("LED") 10, is also included and may be illuminated during the operation of locator 1 to indicate the progress and success of satellite acquisition of the location coordinates. In embodiments where output signal 4 is acoustic tone, an audio speaker 11 may be included as an output device 11 of signal 4. Speaker 11 may be used to produce progress tones for the satellite acquisition sequence as well as the signaling tones containing the coordinate data. In one embodiment, additional information, such as vehicle speed, altitude, and call type, may also be transmitted using output device 11. A connector 8 may be included in some embodiments of locator 1 to provide an external power/charging connection from power sources, such as vehicle power or a solar panel and may also include connections for a serial data port. Additional details of these and other components of locator 1 is described below in conjunction with FIGS. 5 and 6.

In one embodiment, connector 8 may be used to provide GPS data in industry standard NMEA0183 format to a personal digital assistant ("PDA") or a laptop computer with suitable navigation software. Connector 8 may also route information from a computer mapping program, for example, to be downloaded into position locator's 1 memory and subsequently used to enunciate turn-by-turn directions to a driver during travel. Connector 8 may also be used to update position locator's 1 software or to upload trip log information.

Figure 3:
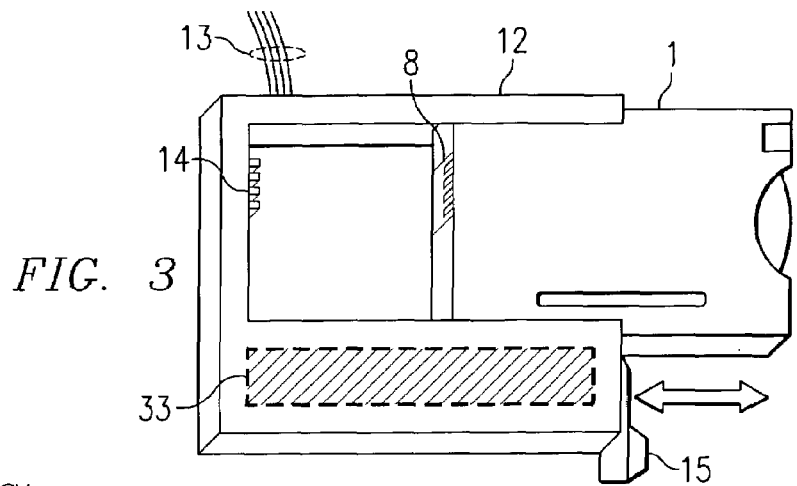
FIG. 3 is a schematic diagram illustrating one embodiment of a cradle that may receive the position locator of FIG. 2.

FIG. 3 is a schematic diagram illustrating one embodiment of a cradle 12 that may receive position locator 1. Cradle 12 may comprise a fastener (not explicitly shown) that is operable to couple cradle 12 to a window of a vehicle. An example of a fastener is double-sided adhesive tape, which is not explicitly shown in FIG. 3. In one embodiment, cradle 12 may also comprise an external power/data port connection 14, which may be wired into a vehicle's twelve-volt power source. In one embodiment, connection 14 may be wired to a vehicle's power source by routing wires 13 over the vehicle's headliner and to the dome, map or visor light circuits, or down to the fuse panel below the dash. In one embodiment, cradle 12 may also comprise a solar panel 33 that is positioned to face skyward, eliminating the need for any wiring. In another embodiment, solar panel 33 may also be positioned on a face of a housing for position locator 1 or cradle 12.

In one embodiment, position locator 1 may slide into place within cradle 12, as shown in FIG. 3, and is retained by a clip 15; however, other ways of securing locator 1 may also be used. Depressing clip 15 allows the user to slide locator 1 back out of cradle 12 for portable use away from the vehicle. In one embodiment, when locator 1 is fully inserted into cradle 12, electrical connection is made between connector 8 and connector 14.

Figure 4A:
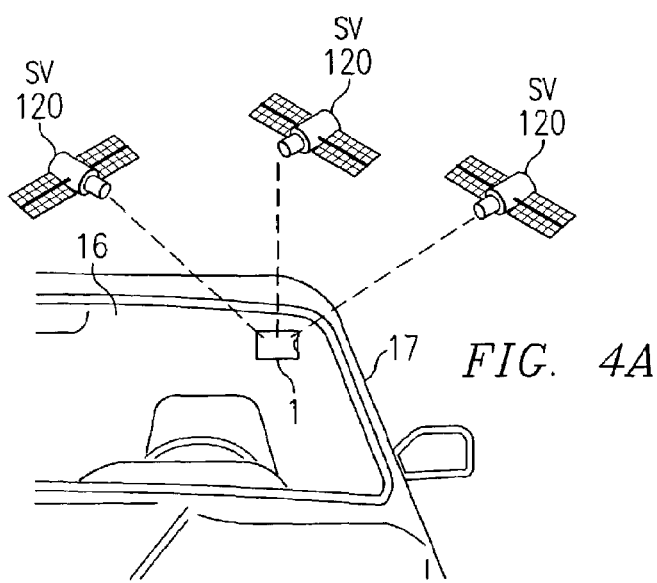
FIG. 4A is a schematic diagram illustrating one embodiment of the position locator of FIG. 2 placed on a window of a vehicle.

FIG. 4A is a schematic diagram illustrating one embodiment of position locator 1 that is placed on a window, such as a windshield 16, of a vehicle 17; however, a window may be other transparent or translucent surface of vehicle 17, such as the back window or side windows. The embodiment of mounting method shown in FIG. 4A allows a GPS antenna of position locator 1 to have an unhindered view of the sky, which is advantageous because such positioning increases the probability of determining a location faster. Position locator 1 may also be positioned in other parts of vehicle 17. For example, position locator 1 may be placed on the dashboard of vehicle 17 or built into the instrument console of vehicle 17. In some embodiments where position locator 1 is built into the instrument console, position locator 1 may be coupled to an external GPS antenna.

Figure 4B:
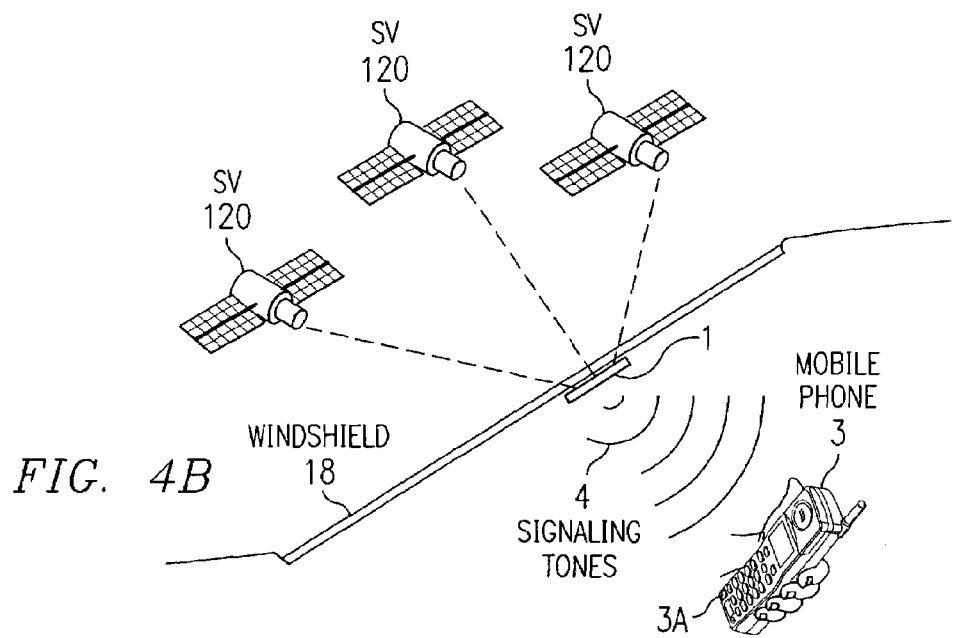
FIG. 4B is a schematic diagram illustrating one embodiment of the position locator of FIG. 4A transmitting an output signal to a mobile phone.

FIG. 4B is a schematic diagram illustrating one embodiment of position locator 1 transmitting output signal 4 to mobile phone 3. Output signal 4 may be in acoustic, infrared, or any other suitable format. When using position locator 1 in vehicle 17, in one embodiment, mobile phone 3 is brought within an effective range of output signal 4 so that output signal 4 may be received by an input unit 3A of mobile phone 3. An example of input unit 3A may be a microphone 3A; however, other input units, such as an infrared receiver, may be used. In one embodiment where output signal 4 is in an acoustic format, such as dual tone multi frequency ("DTMF") audio signal, microphone 3A may receive output signal 4 and send the output signal 4 over a voice channel that has been established by mobile phone 3.

Figure 4C:
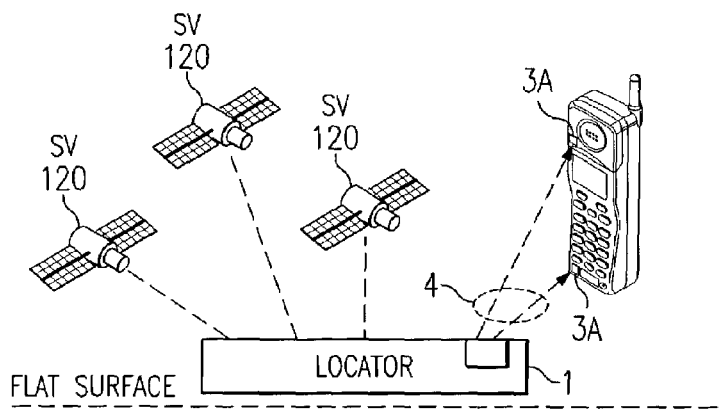
FIG. 4C is a schematic diagram illustrating one embodiment of the position locator of FIG. 2 transmitting an output signal to a mobile phone.

FIG. 4C is a schematic diagram illustrating one embodiment of using position locator 1 away from vehicle 17. In the embodiment shown in FIG. 4C, position locator 1 is placed on a flat surface, such as the ground or a table top, so that position locator 1 has a good view of GPS satellites 120.

Once locator 1 has received the necessary information from GPS satellites 120, locator 1 determines its own position and transmits output signal 4. In the embodiment shown in FIG. 4A, output signal 4 is an infrared beam in a format such as the IrDA standard; however, other signaling formats, such as DTMF or RF may also be used. A user places mobile phone 3 within the effective range of output signal 4 so that output signal 4 is picked up by input unit 3A of mobile phone 3.

Figure 4D:
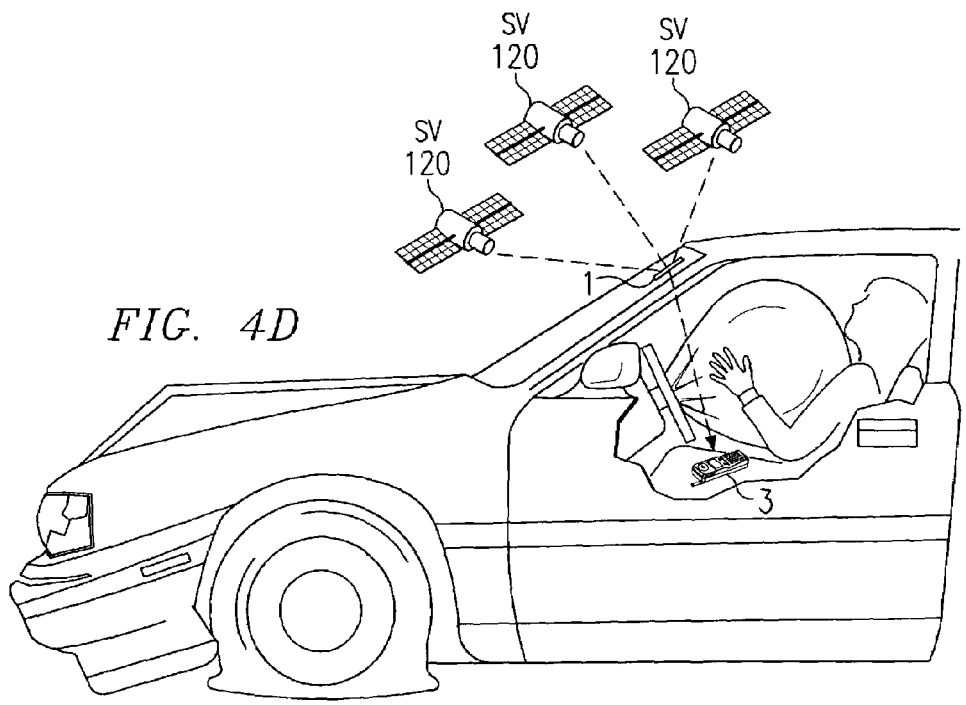
FIG. 4D is a schematic diagram illustrating one embodiment of the position locator of FIG. 2 automatically transmitting an output signal to a mobile phone in an emergency situation.

FIG. 4D is a schematic diagram illustrating one embodiment of position locator 1 automatically transmitting output signal 4 to mobile phone 3 in an emergency situation, such as an automobile accident. In one embodiment, position locator 1 comprises an impact sensor, which is described below in greater detail in conjunction with FIGS. 5 and 6. When vehicle 17 is involved in a collision, the impact sensor senses the impact and automatically initiates a determination of the location of position locator 1. In one embodiment, mobile phone 3 and position locator 1 may each have a transceiver chip that may be used to establish a short-range, wireless connection using Bluetooth™. After the impact sensor senses the impact, it may initiate a transmission of output signal 4 indicating a command for mobile phone 1 to activate itself and dial a phone number associated with an emergency agency, such as a PSAP or a police station. The impact sensor may also initiate a transmission of output signal 4 that indicates the determined location of position locator 1. This is advantageous in some embodiments of the invention because, in emergencies where a user may not be able to call for help, position locator 1 may be used in conjunction with mobile phone 3 to automatically call for help.

Figure 5:
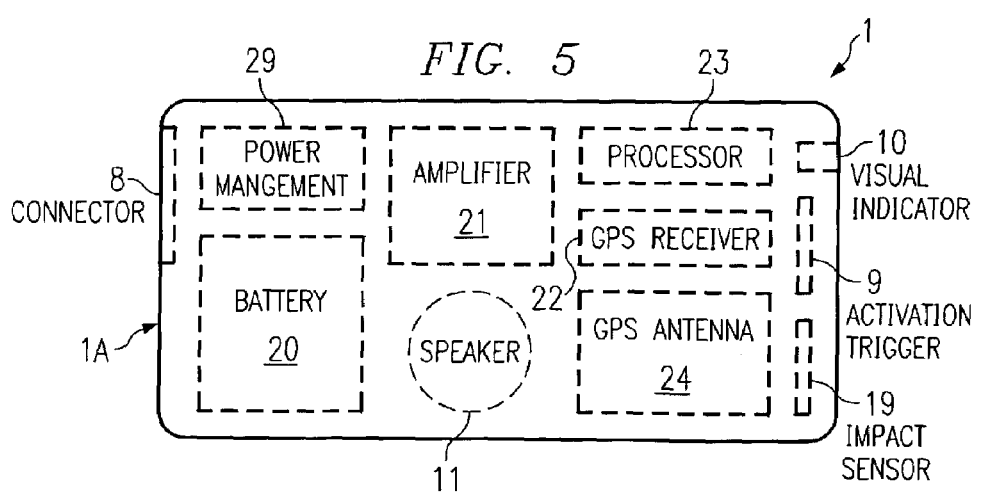
FIG. 5 is a schematic diagram illustrating additional details of one embodiment of the position locator of FIG. 2.

FIG. 5 is a schematic diagram illustrating one embodiment of a layout of position locator's 1 components. In one embodiment, position locator 1 comprises a housing 1A, an activation trigger 9, an impact sensor 19, visual indicator 10, output device 11, a power source 20, connector 8, an amplifier 21, a power management controller 29, a GPS receiver 22, a processor 23, and GPS antenna 24. Housing 1A may be formed from any suitable material, such as plastic. In one embodiment, housing 1A may be shaped like a card; however, housing 1A may be in any other suitable shape. An example of activation trigger 9 is a button; however, any device that allows a user to provide input to position locator 1 may be activation trigger 9. An example of visual indicator 10 is an LED; however, any other device that is operable to visually signal a user may be visual indicator 10. Output device 11 may be any device operable to transmit output signal 4. For example, where output signal 4 is DTMF, output device 11 may be a speaker. Where output signal 4 is in a electromagnetic or infrared format, output device 11 may be an antenna or a bluetooth transceiver chip. Power source 20 may be any source of electrical power. For example, power source 20 may be a battery. In some embodiments where power is provided from an external source, such as solar panel 15, power source 20 may be a rechargeable battery. In some embodiments where power is provided from an external source, such as a vehicle's 17 twelve-volt power source, power source 20 may be omitted. In some embodiments, the arrangement of components may be varied, as determined by one skilled in the art. In some embodiments, more or less components may be required. For example, impact sensor 19 and/or visual indicator 10 may be omitted in some embodiments.

Figure 6:
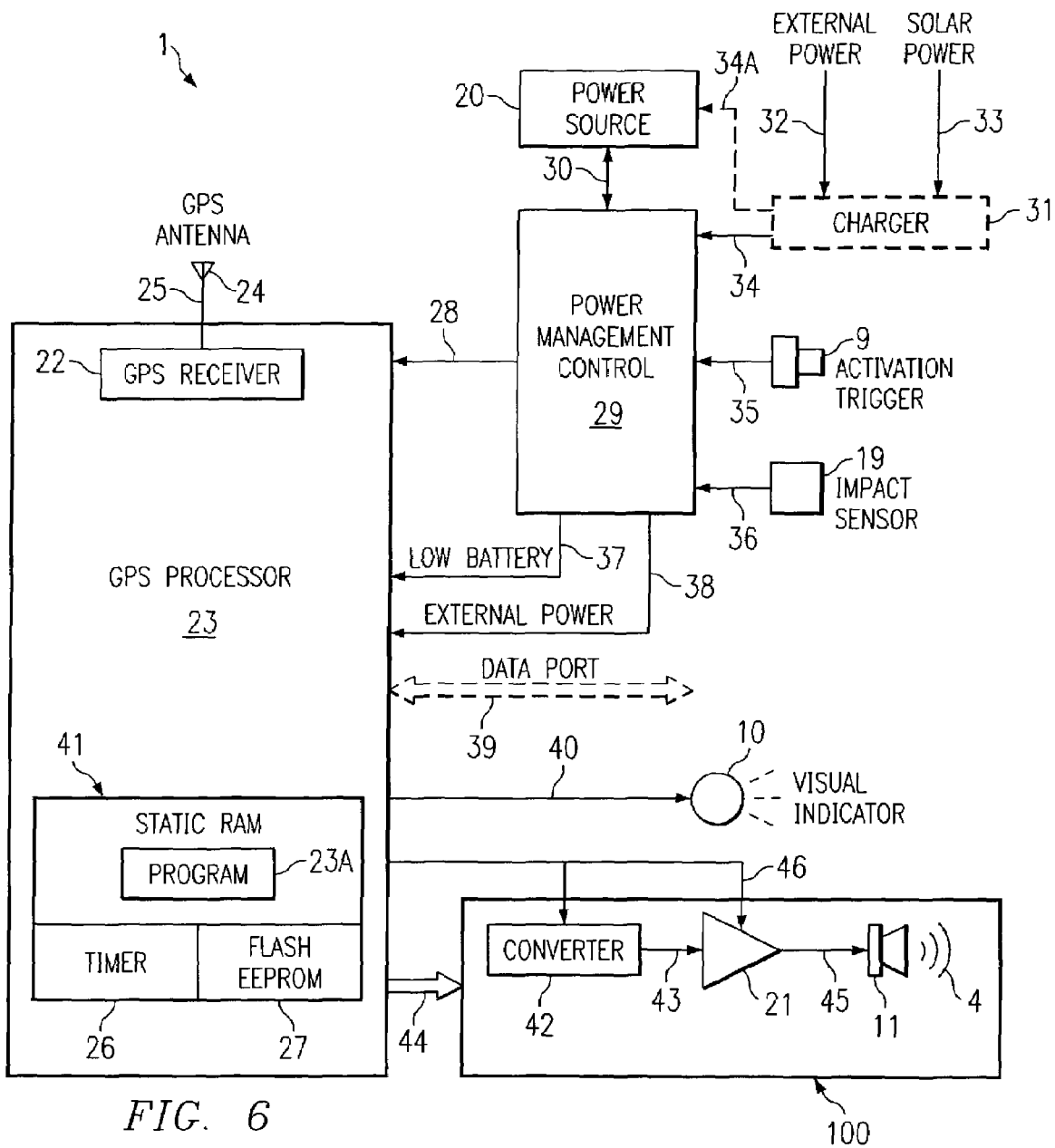
FIG. 6 is a block diagram illustrating additional details of one embodiment of the position locator of FIG. 2.

FIG. 6 is a block diagram illustrating additional details of position locator 1 shown in FIG. 5. A GPS patch antenna 24 is coupled to GPS receiver 22 through a line 25. In one embodiment, antenna 24 and receiver 22 may be of conventional design and are commercially available; however, any antenna and receiver for determining a location may be used. An example of GPS receiver 22 is Axiom Swift™ series GPS receivers available from Axiom Navigation. In one embodiment, processor 23 may be an integral part of GPS receiver 22 and comprises a timer 26 and memories 27 and 41. Memories 27 and 41 may be used to store the personal locator firmware. In one embodiment, power source 20 is a 3.6 volt battery (re-chargeable or non-rechargeable) and may be coupled via a line 30 to power management controller 29; however, any suitable power source may be used as power source 20. An example of power management controller 29 is Maxim MAX1773™, available from Maxim. Power is fed via a line 28 to GPS receiver 22, processor 23, memories 27 and 41 and timer 26.

Processor 23 is connected to an output module 100. In one embodiment, output module 100 comprises a converter 42, an amplifier 21, and output device 11. An example of converter 42 is an 8-bit Digital-to-Analog converter ("DAC"), such as the Maxim MAX5383™, available from Maxim. Although DAC 42 is used as an example of converter 42, any device that converts signals from processor 23 into a particular format of output signal 4 may be used. For example, converter 42 may convert signals from processor 23 into a beam of infrared signal rather than acoustic tones. Converter 42 is coupled to processor 23 via lines 44. In one embodiment, the converted signal from converter 42 is transmitted to the input of amplifier 21 via a line 43. The amplified signal of amplifier 21 is transmitted to output device 11 via line 45. In one embodiment where output signal 44 is in DTMF format, an example of amplifier 21 is a conventional dual audio amplifier design with a rating of approximately 250 mW per channel, such as the National Semiconductor LM4880™ available from National Semiconductor.

In one embodiment, because the voltage of power source 20 is only 3.6V and in order to achieve higher voltage swings at speaker 11, a dual amplifier is used as amplifier 21 and inputs are driven 180 degrees out of phase. Further, amplifier differential output 45 drives both sides of speaker 11. In one embodiment, driving speaker 11 as described above rather than driving only one side of speaker 11 and grounding the other side results in higher output power and therefore higher acoustical energy. In one embodiment, processor 23 uses a control line 46 to turn converter 42 and amplifier 21 on and off as needed.

Although one embodiment of output module 100 is described above, output module 100 may comprise other components depending on the particular format of output signal 4 that is required. For example, output module 100 may comprise a transceiver (not explicitly shown) for sending wireless signals in Bluetooth™ format. The details concerning the conversion of signals from processor 23 into another format, such as the Bluetooth™ format, are well known by one skilled in the art.

Referring back to FIG. 6, a line 37 of power management controller 29 may be used to transmit an indication to processor 23 that power source 20 needs replacement or recharging. In some embodiments where power management controller 29 is operable to assume a sleep mode, timer 26 may periodically wake up processor 23 (every 5 minutes for example) and check for signals transmitted over line 37. If processor 23 determines that power level is low, processor 23 may initiate a signal to the user indicating that the power level is low. For example, processor 23 may initiate a transmission of a tone or synthesize an audible phrase through output device 11, indicating the battery condition. In one embodiment, processor 23 may accomplish this by turning on converter 42 and audio amplifier 21 via line 46 and reading sound waveform data from a table stored in memory 27. Then processor 23 transmits the sound waveform data via serial port 44 which, in turn, drives converter 42. Converter 42 converts the received signals into analog signals in accordance with the data transmitted over line 44 and transmits the converted analog signals to amplifier 21 over line 43. Output device 11 receives the amplified analog signals over line 45. Other methods of informing a user that power level is low may also be used, as determined by one skilled in the art.

In one embodiment, when operating on power source 20 that is internal, personal locator 1 may assume a sleep state. A "sleep state" or a "sleep mode" refers to drawing only enough power to operate timer 26 and retain the most recent GPS almanac and ephemeris data in memory 27. Activation trigger 9 is coupled to power management controller 29 via a line 35 and when depressed, triggers power management controller 29 to wake up processor 23. Processor 23 in turn wakes up GPS receiver 22 and begins searching for satellites 120. In one embodiment, as the search progresses, visual indicator 10 is made to blink periodically, indicating the number of satellites in view and the eventual acquisition of the coordinates. Processor 23 controls visual indicator 10 via a line 40. In one embodiment, processor 23 may also initiate an audible indication of the search progress using output module 100.

In one embodiment, impact sensor 19 is coupled to power management controller 29 using line 36. If impact sensor 19 detects g-forces above a predetermined threshold (during an accident, for example), impact sensor 19 is operable to initiate an activation of processor 23 via a line 36. For example, impact sensor 19 may signal power management controller 29 to apply power to processor 23 via power path 28. In one embodiment, this automatically initiates the location determination process following the accident, giving locator 1 a head start in acquiring satellite information instead of waiting for the occupant to recover enough from the accident to manually activate locator 1. In one embodiment where output module 100 is operable to transmit wireless Bluetooth™ format output signal 4, processor 23 may respond to the impact signal from impact sensor 19 by automatically sending output signal 4 to mobile phone 3 indicating a command to establish a communication path to a predetermined location. Examples of a predetermined location include a PSAP, police station, hospital, fire station, or any other emergency service, agencies. Processor 23 may also send a command to mobile phone 3 to inform the predetermined location that an emergency event has occurred. Processor 23 may also automatically initiate the determination of the location and send output signal 4 indicating the determined location to mobile phone 3 for routing the information of the determined location to the predetermined location. In one embodiment, more than one predetermined locations may be contacted by mobile phone 3. For example, in response to the impact signal from impact sensor 19, processor 23 may command mobile phone 3 to dial all emergency services and the home of the user.

Referring again to FIG. 6, in one embodiment, external power may be provided from sources such as vehicle power or solar power using lines 32 and 33, respectively. In one embodiment, these inputs are coupled to a charging circuit 31 and then to power source 20 over a line 34. In another embodiment, external power input may be provided directly to power management controller 29. An example of charging circuit 31 is Maxim MAX1776™. In one embodiment where external power is provided, GPS receiver 22 and processor 23 remain activated rather than assuming a sleep mode. GPS receiver 22 and processor 23 continuously track satellites 120 and update memory 41 with the latest coordinates as well as almanac and ephemeris data. Furthermore, this data may be logged into memory 27 where it can be retrieved at a later time via a data port 39. When operating from external power, the activation of personal locator 1 may produce output signal 4 immediately if the current location has already been determined.

In one embodiment, processor 23 performs these and other functions described above by executing a program 23A. In some embodiments, program 23A may be stored in memory 41; however, other data storage units may be used to store program 23A or any other data associated with program 23A.

Figure 7B:
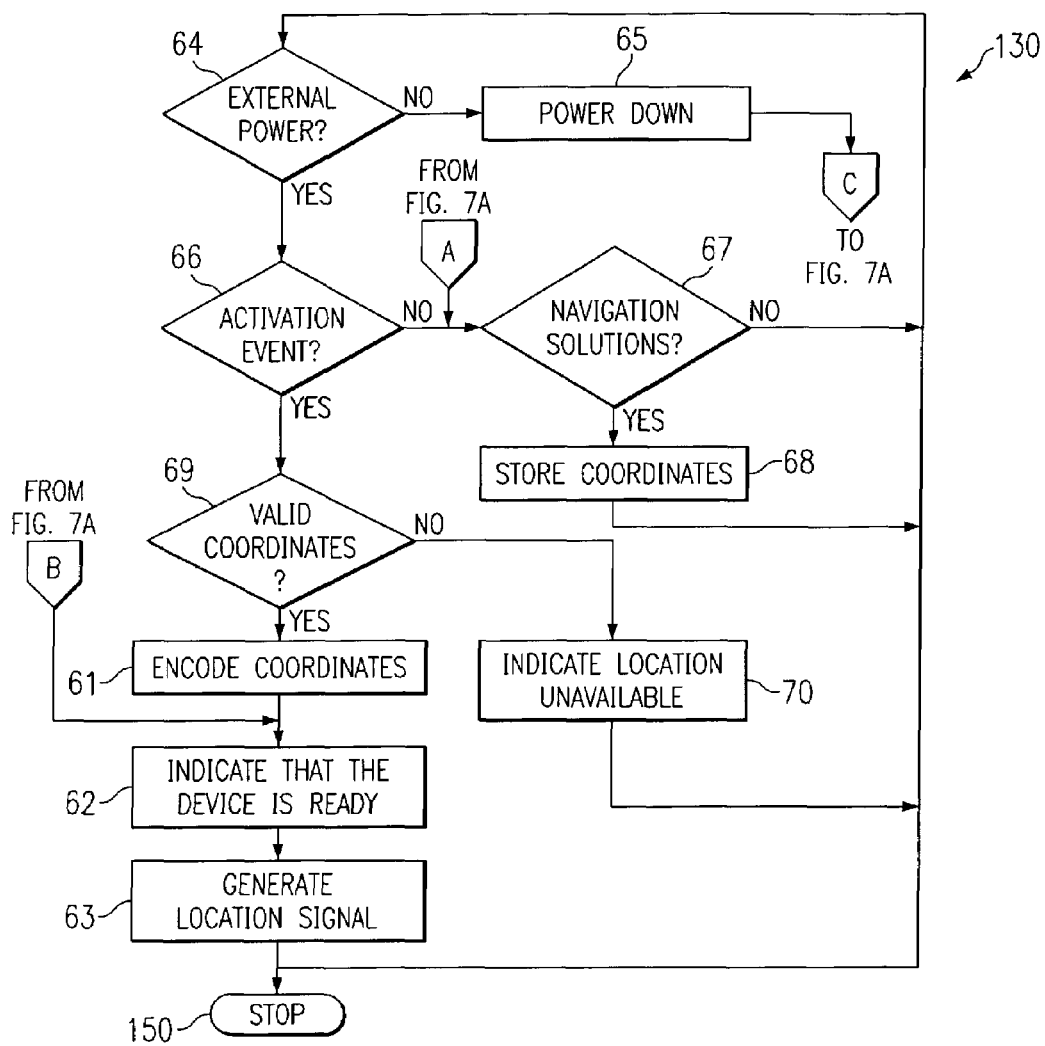

FIGS. 7A and 7B are flow charts illustrating one embodiment of a method 130 of determining a location of mobile phone 3. FIGS. 7A and 7B are described jointly in conjunction with FIG. 6. Some or all of method 130 may be performed by processor 23 that is executing program 23A and/or power management controller 29. Method 130 starts at step 47. At step 48, whether an activation event has occurred is determined. In one embodiment, pressing a button serving as activation trigger 9 may be an activation event of step 48; however, other activation events, such as a signal from impact sensor 19, may be an activation event. If no activation event has occurred, then the "no" branch is followed to step 49 where a test is performed to determine if there is external power available, such as vehicle power. If external power is present, then processor 23 and GPS receiver 22 are activated and method 130 proceeds to step 67, which is described below in conjunction with FIG. 7B. If there is no external power present, the power level of internal power source 20 is checked at step 52. If the battery level is acceptable, method 130 loops back to step 48. If, however, battery 20 determined to be low at step 52, then method 130 proceeds to step 55 where a signal indicating the level of available power is transmitted to a user. For example, a synthesized phrase such as "BATTERY LOW" may be enunciated or a short beep can be emitted, followed by a return to step 48.

Referring again to step 48, if an activation event has occurred, method 130 proceeds to step 50 where power management controller 29 activates GPS receiver 22 and processor 23. The activation of GPS receiver 22 and processor 23 initiates GPS receiver and processor 23 to begin searching for satellites 120. Method 130 then proceeds to step 54 where a test is performed by processor 23 to determine if location coordinates have been acquired. If no coordinates have been determined, method 130 proceeds to step 57 where the elapsed time since the activation at step 50 is determined. If GPS receiver 22 and processor 23 have been on for less than a predetermined time period (3 minutes, for example), method 130 continues to step 53 where processor 23 initiates a transmission of a signal to the user indicating the progress of the satellite search. For example, short audible beeps and/or blinks from visual indicator 10 may indicate to the user that locator 1 is in the process of searching for satellites 120. In one embodiment, the number of beeps or blinks corresponds to the number of satellites 120 in view. For example, one satellite causes one beep and/or one blink, two satellites cause two beeps and/or two blinks. After the progress indication at step 53, method 130 continues to step 54. Referring again to step 57, if the predetermined amount of time has expired, method 130 proceeds to step 59 where an indication that a location has not been determined is transmitted to the user. For example, the phrase "LOCATION UNAVAILABLE" may be enunciated using speaker 11. Method 130 then continues to step 60 where GPS receiver 22 and processor 23 cease to search for satellites 120. Method 130 then proceeds to step 48.

Referring again to step 54, if the location coordinates have been acquired, the coordinates are stored in memories 41 and 27 at step 56. In one embodiment, other associated data, such as time, velocity and altitude, may also be stored in memories 41 and 27 at step 56. Method 130 then continues to step 58 where the coordinates and other data are formatted and encoded into a particular signal format using output module 100. For example, the determined location coordinates and optional data are formatted and encoded as DTMF tones. Details concerning the message format of DTMF tones is described in greater detail below in conjunction with FIG. 8. Method 130 then continues to step 62 (shown in FIG. 7B) where a signal indicating that the user should position mobile phone 3 within an effective range of output signal 4 is transmitted to the user. For example, the word "READY" may be enunciated using speaker 11. In one embodiment where the effective range of output signal 4 is great enough to eliminate any interaction by the user, step 62 may be omitted. For example, where wireless Bluetooth™ signal has an effective range covers the cabin of a vehicle, or where phone 3 is coupled to a particular area of the vehicle that falls within the effective range of the wireless Bluetooth™ signal, the user is not required to manually position mobile phone 3 in a particular place. Thus, an indication to place mobile phone 3 within the effective range of output signal 4 is not necessary, in some embodiments.

Referring to FIG. 7B, method 130 then proceeds to step 63 where output signal 4 is transmitted. In one embodiment, output signal 4 is transmitted multiple times by output module 100. In one embodiment, method 130 then continues to step 64 where a test is performed for the availability of external power 32. If no external power is available, method 130 continues to step 65 where GPS receiver 22 and processor 23 are powered down to conserve battery. Then method 130 returns to step 48 shown in FIG. 7A. However, at step 64, if it is determined that external power is available, method 130 continues to step 66 to determine whether an activation event has occurred. If no activation event has occurred, method 130 continues to step 67 where processor 23 checks for new location coordinates. If there are no new coordinates, method 130 loops back to step 64. If location coordinates are available at step 67, then at step 68 the location coordinates and other data are stored in memories 27 and 41. Then method 130 proceeds to step 64.

Referring again to step 66, if an activation event has occurred, method 130 continues to step 69 where memory 41 is tested for valid location coordinate data. If the location coordinates have not been updated for a predetermined amount of time (5 seconds, for example) or non-existent, method 130 proceeds to step 70 where the user is informed that a location is not determined. For example, the phrase "LOCATION UNAVAILABLE" may be enunciated using speaker 11. Method 130 then continues to step 64 where the test for external power is performed.

Returning again to step 69, if coordinates are available, method 130 proceeds to step 61 where the location coordinates and other appropriate data are formatted and encoded to a particular signal format, such as DMTF. Method 130 then proceeds to step 62, which has already been described above.

Figure 7C:
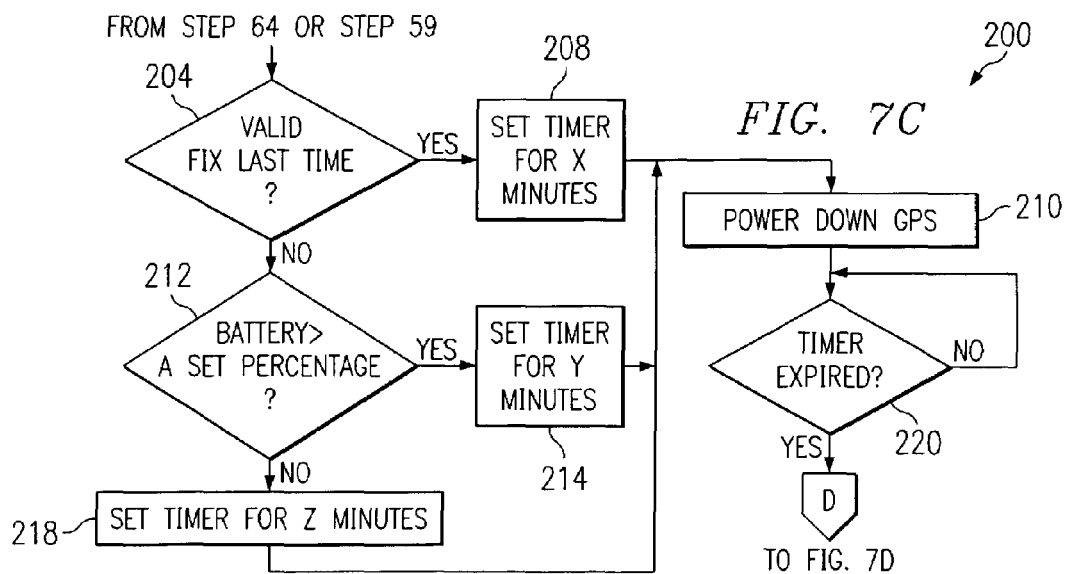

FIGS. 7C and 7D are flow charts illustrating one embodiment of a method 200 for power management and location information update that may be used in conjunction with method 130 of FIG. 7A. For example, method 200 may be used at steps 60 and/or 65 of method 130. At step 204, processor 23 determines whether information identifying a location is stored in memories 27 and/or 41. An example of such information is a GPS grid coordinate identifying the location of position locator 1. If location information is determined to be stored in memories 27 and/or 41, then processor 23 sets timer 26 for a predetermined time period (60 minutes, for example). Then at step 210, processor 23 assumes a sleep mode.

Referring back to step 204, if information identifying a location is not stored in memories 27 and/or 41, then at step 212, processor 23 determines whether the level of available power from power source 20 is above a predetermined level. For example, the predetermined level of power may be 80%; however, other predetermined level of power may be used depending on the design specification of position locator 1. If the level of available power is determined to be above the predetermined level, then the "yes" branch is followed to step 214, where timer 26 is set for a predetermined time period (15 minutes, for example).

Referring back to step 212, if the power level is determined to be equal or below the predetermined level, then the "no" branch is followed to step 218 where timer 26 is set for a time period that is different than the time period used at steps 208 and 214. For example, timer 26 may be set at 30 minutes. In one embodiment, the time period of step 208 is longer than the respective time periods of steps 214 and 218. In one embodiment, the time period of step 214 is shorter than the respective time periods of steps 208 and 218. Then method 200 proceeds to step 210, which has already been described above. At step 220, processor 23 determines whether a particular time period of steps 208, 214, or 218 has expired. If it has not, then method 200 loops back to step 220. If the particular time period has expired, then method 200 moves to step 224 shown in FIG. 7D.

Referring to FIG. 7D, at step 224, processor 23 determines whether the power level of power source 20 is below a predetermined level. For example, the predetermined power level may be 80% of the full capacity of power source 20. If the available power level is below the predetermined level, then at 228, timer 26 is set for a predetermined time period. Then at step 244, position locator 1 assumes a sleep mode.

Referring back to step 224, if the available power level is not below the predetermined level, then at step 230, timer 26 is set for another predetermined time period. For example, timer 26 may be set for 30 seconds at step 230; however, timer 26 may be set for a different duration. Then at step 234, GPS receiver 22 is activated. At step 238, processor 23 determines whether the time period of timer 26 has expired. If not, then method 200 is looped back to step 238. If the time period is expired, then the "yes" branch is followed to step 240. At step 240, processor 23 determines whether there was a prior time period extension. Time period extension is described below in conjunction with steps 248, 250, 258, and 264. If there was a previous extension of time, then GPS receiver 22 and processor 23 power down and assume a sleep state at step 244. If no previous extension of time was made, then the "no" branch is followed to step 248.

At step 248, processor 23 determines the number of satellite vehicles 120 from which position locator 1 is able to receive location information. If the number is 1, then the "1" branch is followed to step 250 where the time period set at timer 26 is extended by a first predetermined time period. Then method 200 proceeds to step 238. If the number is 2, then the "2" branch is followed to step 258 where the time period set at timer 26 is extended by a second predetermined time period. Then method 200 proceeds to step 238. If the number is equal to or greater than 3, then the "3" branch is followed to step 264 where the time period set at timer 26 is extended by a third time period. Then method 200 proceeds to step 238. If the number is 0, then method 200 moves to step 244. In some embodiments, method 200 may transition from step 244 to step 48 of method 130. In some embodiments, method 200 may transition from step 244 to step 50 of method 130.

Figure 7E:
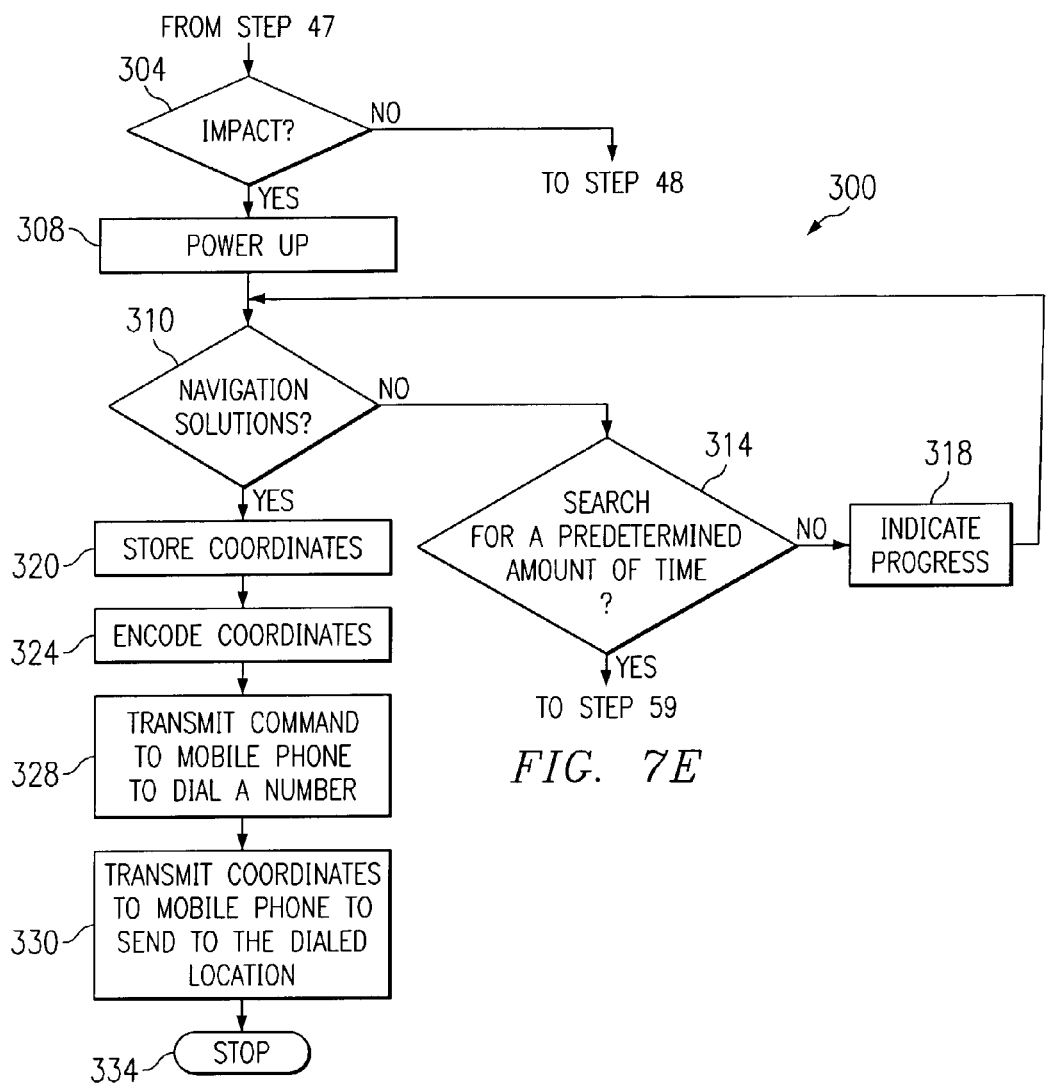
FIG. 7E is a flow chart illustrating one embodiment of a method for using the position locator of FIG. 2 as an emergency notification device.

FIG. 7E is a flow chart illustrating one embodiment of a method 300 for using position locator 1 as an emergency alert device. Method 300 may be used in conjunction with methods 130 and 200. In some embodiments, method 300 may be implemented prior to step 48 of method 130. For example, after step 47 of method 130, whether an impact has occurred is determined at step 304. This determination may be made using impact sensor 19, for example. If no impact has occurred, then the "no" branch is followed to step 48 of method 130. If an impact has occurred, then position locator 1 is powered up at step 308. At step 310, processor 23 determines whether a location of position locator 1 has been determined. If no location information has been determined, method 300 continues to step 314 where the elapsed time since the power up at step 50 is determined. If GPS receiver 22 and processor 23 have been on for less than a predetermined time period (3 minutes, for example), method 300 continues to step 318 where processor 23 initiates a transmission of a signal indicating the progress of the satellite search. For example, short audible beeps and/or blinks from visual indicator 10 may indicate to the user that locator 1 is in the process of searching for satellites 120. In one embodiment, the number of beeps or blinks corresponds to the number of satellites in view. For example, one satellite causes one beep and/or one blink, two satellites cause two beeps and/or two blinks in rapid succession. After the progress indication in step 318, method 300 continues to step 310 where the determination of location is tested.

Referring again to step 310, if location coordinates have been acquired, then at step 320, the location coordinates and any other data, such as time, velocity and altitude, are stored in memories 41 and 27. Method 300 then continues to step 324 where the coordinates and any other data are formatted and encoded into a particular signal format. For example, the determined coordinates and any other data are formatted and encoded as Bluetooth™ infrared beams. At step 328, position locator 1 transmits a wireless command for mobile phone 3 to establish a communication channel with a predetermined location, such as PSAP 6 or other emergency agencies. At step 330, the location coordinates are transmitted from position locator 1 to mobile phone 3 so that the location coordinates may be routed to the destination with which mobile phone 3 has established a communication channel at step 328. Method 300 stops at step 334.

Figure 8A:
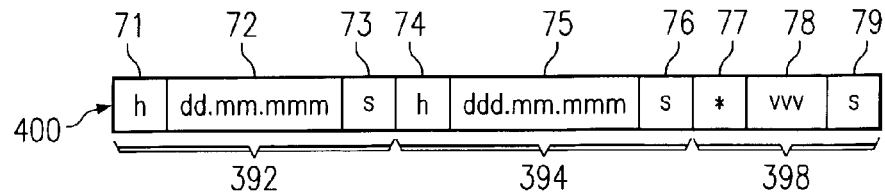
FIG. 8A is a schematic diagram illustrating one embodiment of a message that is transmitted as an output signal from the position locator of FIG. 2.
Figure 8B:
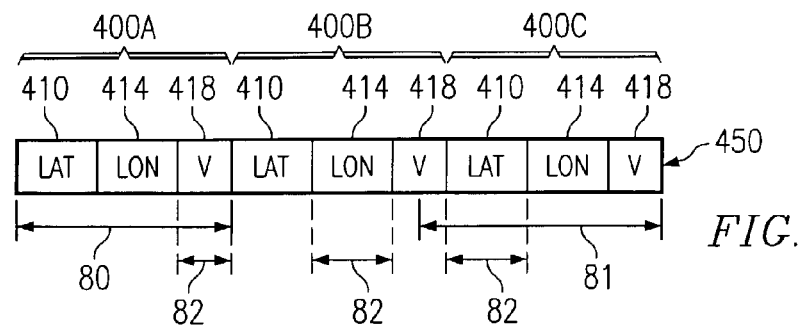
FIG. 8B is a schematic diagram illustrating one embodiment of a message stream that is transmitted as an output signal from the position locator of FIG. 2.

FIGS. 8A and 8B are schematic diagrams illustrating one embodiment of a message 400 and a message stream 450 that may be transmitted from position locator 1 to mobile phone 3 as output signal 4. FIGS. 8A and 8B are described jointly. As shown in FIG. 8A, message 400 illustrates an exemplary DTMF signal format comprising location coordinates and velocity data. Although DTMF encoding is used in this example, other signal formats may also be used. In some embodiments where DTMF signal format is used, a DTMF decoder (not explicitly shown) is located at the destination that is receiving the communication from mobile phone 1. For example, PSAP 6 or operator station 7 may have a DTMF decoder that is controlled by a computer or a sound card within a computer. The DTMF decoder is programmed to detect the specific tones and also decipher the message contents. However, other types of decoders may be used where the signal format is different from the DTMF format.

In one embodiment, a message 400 transmitted from speaker 11 comprises a latitude group 392, a longitude group 394, and a velocity group 398. Latitude group 392 comprises a delimiter 71, a latitude packet 72, and a checksum 73. Longitude group 394 comprises a delimiter 74, a longitude packet 75, and a checksum 76. Velocity group 398 comprises a delimiter 77, a velocity packet 78, and a checksum 79. Because delimiters 71, 74 and 77 and checksums 73, 76 and 79 are used for data integrity and because the data is static during the output of multiple messages 400, the three message components—latitude packet 72, longitude packet 75 and velocity packet 78—do not have to be read in sequence. Delimiters 71, 74, and 77 and checksums 73, 76, and 79 are commonly used techniques for ensuring valid data and well known to one skilled in the art. In one embodiment, the use of delimiters 71, 74, and 77 and checksums 73, 76, and 79 is advantageous because errors in transmitting output signal 4 to mobile phone 3 may be allowed to occur without causing transmission failure. This is described below using capture scenarios 80, 81 and 82, in conjunction with FIG. 8B.

Delimiters 71, 74, and 77 may be thought of as synchronization characters or boundary markers that indicate the start of a new message. There are 16 standard DTMF tone pairs in the telephony standard: 0-9, A-D, * and #. In one embodiment, the tone pairs for A-D (not found on a typical telephone) are used for delimiters for latitude group 392 and longitude group 394. In one embodiment, delimiters 71, 74, and 77 may also designate North/South hemispheres and East/West hemispheres. For example, DTMF values "A" or "B" may indicate the start of latitude group 392, but "A" may also indicate the Northern hemisphere whereas "B" indicates the Southern hemisphere. Likewise, DTMF values "C" or "D" may indicate the start of longitude group 394, but "C" also designates the Eastern hemisphere whereas "D" indicates the Western hemisphere. In one embodiment, the DTMF value "*" is used as the velocity delimiter digit. Other DTMF tone pairs may be designated to indicate other information, as determined by one skilled in the art.

In one embodiment, checksums 73, 76 and 79 are the least significant base-10 digits derived from the summation of all preceding digit values for their respective data fields and include their respective delimiters 71, 74, and 77. For example, checksum 73 of latitude group 392 is the least significant digit of the sum of delimiter 71 plus all 7 latitude digits in latitude packet 72. At PSAP 6 or operator station 7, the decoder duplicates this calculation when receiving the data and compares the transmitted checksum 73 with the checksum it calculated based upon the received digits. If they match, then data is considered valid. If they don't match, then the data is considered invalid.

As shown in FIG. 8B, one embodiment of the format of message 400 may be expressed as hddmm.mmmshdddmm.mmms*vvvs where;

h latitude and longitude delimiters and hemisphere designation (A=Northern Latitude, B=Southern Latitude)

(C=Eastern longitude, D=Western longitude)

d=geodetic degrees m=geodetic minutes s=decimal checksum (0-9) for all proceeding digits including the delimiter

*=velocity delimiter v=velocity value in miles or kilometers per hour (0-999)

The decimal places are inferred by the receiver but not actually sent.

In one embodiment, the resolution of the coordinates in the disclosed format is one thousandth of a minute, which is approximately 6 feet. Due to digital indecision of one digit, this translates into a tolerance (error) of +/−6 feet, or less than the length of a sub-compact car.

Referring to FIG. 8B, message stream 450 is formed from multiple messages 400A, 400B, and 400C that are serially arranged. Each one of messages 400A through 400C comprises a latitude group 410, a longitude group 414, and a velocity group 418. In one embodiment, latitude group 410, longitude group 414, and velocity group 418 are analogous to the respective formats of latitude group 392, longitude group 394, and velocity group 398. Capture 80 depicts an ideal case where message 400A is successfully captured without interruption in the normal sequence. Capture 81 illustrates a case where mobile phone 3 or the tone decoder has received sufficient signal strength somewhere in the middle of velocity group 418 of message 400B, causing that velocity group 418 to fail and be rejected. In this scenario, however, mobile phone 3 is held in place long enough for the entire message 400C to be captured successfully. Capture 82 illustrates a scenario where there is a significant noise level causing some of the data to be dropped during the transmission of messages 400A through 400C. In this example, groups from three different messages 400A through 400C have been captured; velocity group 418 from message 400A, longitude group 414 from message 400B, and latitude group 410 from message 400C. The data transfer is complete and valid in this scenario even though groups 410, 414, and 418 are out of sequence and from different messages 400A through 400C.

Although some embodiments of the present invention have been described in detail, it should be understood that various changes, substitutions, and alterations can be made hereto without departing from the spirit and scope of the invention as defined by the appended claims.

What is claimed is:

1. An apparatus for identifying the location of a mobile phone, comprising:
    a housing coupled to a fastener, the fastener operable to attach to a window of an automobile;
    a power management controller positioned in the housing, the power management controller coupled to a power source;
    an activation trigger positioned at least partially in the housing, wherein the activation trigger sends an activation command to the power management controller;
    a position locator positioned at least partially in the housing, wherein the position locator determines a location by receiving information from one or more satellites and transmits a digital signal indicating the determined location, the position locator coupled to the power management controller;
    a visual indicator positioned at least partially in the housing and coupled to the position locator;
    a converter positioned in the housing and coupled to the position locator, wherein the converter converts the digital signal received from the position locator into a dual tone multi frequency audio signal indicating the determined location; and
    a speaker positioned at least partially in the housing and coupled to the converter, wherein:
        the speaker outputs the dual tone multi frequency audio signal indicating the determined location;
        the dual tone multi frequency audio signal comprises a latitude group, a longitude group, and a velocity group;
        the latitude group, the longitude group, and the velocity group each comprise a respective delimiter;
        a first tone represents a delimiter associated with the latitude group;
        a second tone represents a delimiter associated with the longitude group; and
        a third tone represents a delimiter associated with the velocity group.

2. The apparatus of claim 1, wherein the power source is a solar panel that is attached to a surface of the housing.

3. The apparatus of claim 1, and further comprising an impact sensor positioned in the housing and coupled to the power management controller, wherein the impact sensor senses an impact and in response, automatically initiates the determination of the location by the position locator.

4. The apparatus of claim 1, wherein the power management controller assumes a sleep mode for power conservation.

5. The apparatus of claim 1, and further comprising a data storage unit coupled to the position locator, wherein the position locator stores information indicating the determined location in the data storage unit and initiates a display of the stored information after the power management controller is activated.

6. The apparatus of claim 1, wherein the position locator:
    receives satellite information identifying an area where the one or more satellites are positioned; and
    using the satellite information, searches for the one or more satellites within the area.

7. The apparatus of claim 1, wherein:
    the power source is a battery having a power level;
    the position locator updates the determined location, the updating performed after a configurable time period;
    if the power level exceeds a configurable level, the configurable time period is a first time period; and
    if the power level does not exceed the configurable level, the configurable time period is a second time period.

8. An apparatus for locating a mobile phone, comprising:
    a portable housing;
    a position locator positioned at least partially in the portable housing, wherein the position locator determines a location of a mobile phone by receiving information from one or more satellites and transmits a signal indicating the determined location;
    an impact sensor positioned at least partially in the portable housing and coupled to a processor;
    the processor positioned at least partially in the portable housing, wherein the processor transmits a command to the mobile phone to automatically dial a phone number associated with an emergency agency;
    a converter positioned in the portable housing and coupled to the position locator, wherein the converter converts the signal received from the position locator into an output signal for the mobile phone, wherein the output signal is a dual tone multi frequency audio signal that is receivable by a microphone of the mobile phone; and an output device positioned at least partially in the portable housing and coupled to the converter, wherein the output device sends the dual tone multi frequency audio signal to the mobile phone, wherein:
  the dual tone multi frequency audio signal comprises a latitude group, a longitude group, and a velocity group;
  the latitude group, the longitude group, and the velocity group each comprise a respective delimiter;
  a first tone represents a delimiter associated with the latitude group;
  a second tone represents a delimiter associated with the longitude group; and
  a third tone represents a delimiter associated with the velocity group.

9. The apparatus of claim 8, and further comprising a solar panel that is attached to a surface of the portable housing.

10. The apparatus of claim 8, wherein the impact sensor senses an impact and automatically initiates the determination of the location by the position locator.

11. The apparatus of claim 8, and further comprising a data storage unit coupled to the position locator, wherein the position locator stores information indicating the determined location in the data storage unit and initiates a display of the stored information after the position locator is activated.

12. The apparatus of claim 8, wherein the position locator:
  receives satellite information identifying an area where the one or more satellites are positioned; and
  using the satellite information, searches for the one or more satellites within the area.

13. The apparatus of claim 12, wherein:
  the search lasts for a configurable time period;
  if one satellite is found, the configurable time period is extended by a first time period;
  if two satellites are found, the configurable time period is extended by a second time period; and
  if three satellites are found, the configurable time period is extended by a third time period.

14. The apparatus of claim 8, and further comprising a cradle that is attachable to a window of an automobile, wherein the cradle receives the portable housing.

15. The apparatus of claim 8, and further comprising a cradle that is attachable to a window of an automobile, the cradle comprising a solar panel that is positioned to face the window when attached to the window, wherein the cradle receives the portable housing and electrically couples the solar panel to the position locator positioned in the portable housing.

16. An apparatus for locating a mobile phone, comprising:
  a position locator determining a location and generating a location signal indicating the determined location;
  impact sensing means for sensing an impact and in response, initiating the determination of the location by the position locator;
  a conversion means for converting the location signal into an output signal, wherein the output signal is a dual tone multi frequency audio signal that is receivable by an input unit of a mobile phone to be located;
  a transmission means for wirelessly transmitting the dual tone multi frequency audio signal to the mobile phone, wherein:
    the dual tone multi frequency audio signal comprises a latitude group, a longitude group, and a velocity group;
    the latitude group, the longitude group, and the velocity group each comprise a respective delimiter;
    a first tone represents a delimiter associated with the latitude group;
    a second tone represents a delimiter associated with the longitude group; and
    a third tone represents a delimiter associated with the velocity group; and
  means for packaging the position locator, the impact sensing means, the conversions means, and the transmission means as a single package that is attachable to a window of an automobile.

17. The apparatus of claim 16, and further comprising means for collecting solar energy coupled to the means for packaging the position locator.

18. The apparatus of claim 16, and further comprising means for transmitting a command to the mobile phone to automatically dial a phone number associated with an emergency agency.

19. The apparatus of claim 16, and further comprising means for storing data coupled to the position locator, wherein the position locator stores information indicating the determined location in the means for storing data and initiates a display of the stored information after the position locator is activated.

20. The apparatus of claim 16, wherein the position locator:
  receives satellite information identifying an area where the one or more satellites are positioned; and
  using the satellite information, searches for the one or more satellites within the area.

21. The apparatus of claim 16, wherein the input unit is a microphone.

22. The apparatus of claim 16, and further comprising a cradle that is attachable to a window of an automobile, wherein the cradle receives the means for packaging.

23. The apparatus of claim 16, and further comprising a cradle that is attachable to a window of an automobile, wherein the cradle:
  comprises a solar panel that is positioned to face the window when attached to the window; and
  receives the portable housing and electrically couples the solar panel to the position locator.

24. A mobile phone locator system comprising:
  a portable housing;
  a cradle, wherein the cradle receives the portable housing and electrically couples the portable housing to an external device, the cradle attachable to a window of an automobile;
  an impact sensor positioned at least partially in the portable housing, wherein the impact sensor activates a position locator after sensing an impact;
  the position locator positioned at least partially in the portable housing, wherein the position locator determines a location by communicating with one or more satellites and transmits a signal indicating the determined location;
  a converter positioned in the portable housing and coupled to the position locator, wherein the converter converts the signal received from the position locator into an output signal for the mobile phone, wherein the output signal is a dual tone multi frequency audio signal that is receivable by a microphone of a mobile phone to be located; and
  an output device positioned at least partially in the portable housing and coupled to the converter, wherein the output device sends the dual tone multi frequency audio signal to the mobile phone, wherein:

the dual tone multi frequency audio signal comprises a latitude group, a longitude group, and a velocity group;

the latitude group, the longitude group, and the velocity group each comprise a respective delimiter;

a first tone represents a delimiter associated with the latitude group;

a second tone represents a delimiter associated with the longitude group; and a third tone represents a delimiter associated with the velocity group.

25. The system of claim 24, wherein the portable housing further comprises a solar panel that is attached to a surface of the portable housing.

26. The system of claim 24, and further comprising a solar panel that is coupled to a cradle.

27. The system of claim 24, and further comprising a data storage unit positioned in the portable housing and coupled to the position locator, wherein the position locator stores information indicating the determined location in the data storage unit and initiates a display of the stored information after the position locator is activated.

28. The system of claim 24, wherein the position locator:
receives satellite information identifying an area where the one or more satellites are positioned; and
using the satellite information, searches for the one or more satellites within the area.

29. A method for locating a mobile phone, comprising:
providing an apparatus comprising:
a portable housing;
a position locator positioned at least partially in the portable housing, wherein the position locator determines a location by receiving information from one or more satellites and transmits a signal indicating the determined location;
an impact sensor positioned at least partially in the portable housing, wherein the impact sensor activates the apparatus after sensing an impact;
a converter positioned in the portable housing and coupled to the position locator, wherein the converter converts the signal received from the position locator into an output signal for the mobile phone, wherein the output signal is a dual tone multi frequency audio signal having an effective range; and
an output device positioned at least partially in the portable housing and coupled to the converter, wherein:

the output device wirelessly transmits the dual tone multi frequency audio signal to the mobile phone;

the dual tone multi frequency audio signal comprises a latitude group, a longitude group, and a velocity group;

the latitude group, the longitude group, and the velocity group each comprise a respective delimiter;

a first tone represents a delimiter associated with the latitude group;

a second tone represents a delimiter associated with the longitude group; and a third tone represents a delimiter associated with the velocity group;

coupling the apparatus to a window of a vehicle; and positioning an input unit of the mobile phone within the effective range of the dual tone multi frequency audio signal.

30. The method of claim 29, further comprising:
automatically commanding the mobile phone, using the apparatus, to establish a communication channel to a predetermined location; and
automatically transmitting the output signal to the mobile phone for transmission to the predetermined location.

31. The method of claim 30, wherein the predetermined location is a call center that transmits the determined location indicated by the output signal to an emergency service.

32. The method of claim 29, and further comprising automatically transmitting an emergency signal indicating that an emergency has occurred at the location indicated by the output signal.

33. The method of claim 29, wherein the apparatus further comprises a solar panel that is attached to a surface of the portable housing.

34. The method of claim 29, and further comprising:
receiving, at the apparatus, satellite information identifying an area where the one or more satellites are positioned; and
searching, using the satellite information, for the one or more satellites within the area using the position locator.

* * * * *